(12) United States Patent
Darras et al.

(10) Patent No.: US 11,143,364 B2
(45) Date of Patent: Oct. 12, 2021

(54) ILLUMINATED PANEL

(71) Applicant: LuxTech, LLC, Philadelphia, PA (US)

(72) Inventors: Sean R. Darras, Media, PA (US); Alexander Harris Nicolaides, New York, NY (US)

(73) Assignee: LuxTech, LLC, Philadelphia, PA (US)

( * ) Notice: Subject to any disclaimer, the term of this patent is extended or adjusted under 35 U.S.C. 154(b) by 0 days.

(21) Appl. No.: 16/597,384

(22) Filed: Oct. 9, 2019

(65) Prior Publication Data

US 2020/0124238 A1 Apr. 23, 2020

Related U.S. Application Data

(60) Provisional application No. 62/747,555, filed on Oct. 18, 2018.

(51) Int. Cl.
| | |
|---|---|
| *G02B 5/02* | (2006.01) |
| *H05B 45/10* | (2020.01) |
| *F21K 9/60* | (2016.01) |
| *G02B 5/22* | (2006.01) |
| *F21S 8/02* | (2006.01) |
| *F21Y 113/10* | (2016.01) |
| *F21W 131/30* | (2006.01) |
| *F21Y 115/10* | (2016.01) |

(52) U.S. Cl.
CPC ............. *F21K 9/60* (2016.08); *G02B 5/0215* (2013.01); *G02B 5/226* (2013.01); *H05B 45/10* (2020.01); *F21S 8/024* (2013.01); *F21S 8/026* (2013.01); *F21W 2131/30* (2013.01); *F21Y 2113/10* (2016.08); *F21Y 2115/10* (2016.08)

(58) Field of Classification Search
CPC ............ F21K 9/60; G02B 5/226; H05B 45/10
See application file for complete search history.

(56) References Cited

U.S. PATENT DOCUMENTS

| | | |
|---|---|---|
| 5,825,436 A | 10/1998 | Knight |
| 9,910,301 B2 | 3/2018 | Branda et al. |
| 2008/0186737 A1* | 8/2008 | Awai ............... G02B 6/002 362/617 |
| 2011/0058113 A1 | 3/2011 | Threlkel et al. |
| 2013/0038643 A1 | 2/2013 | Chung et al. |
| 2014/0300274 A1 | 10/2014 | Acatrinei |
| 2016/0011429 A1 | 1/2016 | Vdovin et al. |
| 2016/0091760 A1 | 3/2016 | Ogura et al. |
| 2016/0356942 A1 | 12/2016 | Cherekdjian et al. |

(Continued)

FOREIGN PATENT DOCUMENTS

| | | |
|---|---|---|
| CN | 201071674 Y | 6/2008 |
| KR | 10-1367913 B1 | 2/2014 |

OTHER PUBLICATIONS

Non-Final Office Action dated Dec. 30, 2019 for U.S. Appl. No. 16/597,377, 8 pages.

(Continued)

*Primary Examiner* — Karabi Guharay
(74) *Attorney, Agent, or Firm* — Cooley LLP

(57) ABSTRACT

The disclosure relates in general to illuminated panels resembling windows, and more particularly, to a system containing a light source, a diffuser and a panel combined in such a fashion as to resemble a window, skylight or curtain wall.

20 Claims, 5 Drawing Sheets

(56) References Cited

U.S. PATENT DOCUMENTS

2017/0183867 A1    6/2017    Sollohub et al.
2019/0228719 A1\*  7/2019    Kato .................... G02F 1/1334

OTHER PUBLICATIONS

International Search Report and Written Opinion dated Jan. 16, 2020 for International Application No. PCT/US2019/56633, 12 pages.
International Search Report and Written Opinion dated Jan. 16, 2020 for International Application No. PCT/US2019/56634, 11 pages.
AEC Info "Infinity Edge Double Glazed" Product Catalogue [online], Oct. 7, 2007 [retrieved Dec. 20, 2019]. Retrieved from the Internet: <URL: https://www.aecinfo.com/1/company/08/72/37/product329603_1.html#spects>, p. 2, figure 1, figure 1 description (2 pages).
CB2 "Infinity 32'x76' Floor Mirror" Product Catalogue [online], Jun. 19, 2012 [retrieved Dec. 17, 2019]. Retrieved from the Internet: <URL:https:///www.cb2.com/infinity-32x76-floor-mirror/s178538>, 3 pages.

\* cited by examiner

ILLUMINATED PANEL

CROSS-REFERENCE TO RELATED APPLICATIONS

This application claims priority and the benefit of U.S. Provisional Application No. 62/747,555, filed Oct. 18, 2018, entitled "Illuminated Panel", which is hereby incorporated herein by reference in its entirety.

FIELD

The disclosure relates in general to illuminated panels resembling windows, and more particularly, to a system containing a light source, a diffuser and a front panel combined with a frame in such a fashion as to resemble a window, skylight or curtain wall.

BACKGROUND

It is frequently desirable to have windows or skylights in rooms, as room occupants may feel more at ease and may have increased productivity resulting therefrom. Known lighting fixtures often do little to create the feeling of natural lighting. Historically, windows have only been possible on walls of rooms at the outside perimeter of a building, and skylights only on ceilings of rooms at the top of a building, as exterior access is typically necessary for the passive window or skylight to admit sunlight. The result is the problem that the benefits of such exterior lighting are available only to certain occupants of the building.

In recent years, the performance of LEDs (Light Emitting Diodes) has improved to the point where their CCT (Coordinated Color Temperature) and CRI (Color Rendition Index) may be selected to closely resemble that of sunlight, both at high noon as well as at other times of the day. It would be desirable to have an LED system that could be used to resemble windows or skylights without requiring the room using such a system to have access to an exterior surface of the building. It would be further desirable if such a system could closely resemble physically a traditional window or skylight. It would also be desirable if such a system could have its CCT and CRI adjustable to resemble other times of the day.

SUMMARY

In one or more embodiments, the system utilizes a frame containing a number of elements. The frame contains a light source with control and power circuitry (also referred to herein as "control circuitry," "power circuitry" or "LED driver"), a diffuser and a front panel. The light source when controlled to the "on" state illuminates the diffuser, which diffuses the light source in such a way as to appear approximately uniform over its surface. The light from the diffuser passes through the front panel, providing the visual impression of depth to the light source. The frame may include an infinity edge, creating the effect that the emitting surface of the front panel is detached from, and floating above the frame. The frame may also include a shroud to more closely resemble a traditional window or skylight. For example, the shroud can be coupled to and disposed a non-zero distance from the frame.

In one or more embodiments, the light source may be a set of white LEDs and the power circuitry may be a constant current driver to run the LEDs. The control circuity, if present, may be an on/off switch, or may provide the ability to set the brightness of the LEDs by controlling the output current of the power circuitry.

In another embodiment, the light source may be a set of multi-colored LEDs, such as red, green and blue (RGB). The power circuitry may be a set of constant current drivers to run the set of LEDs at different respective currents. The control circuitry may provide ability to set the color, CCT and/or CRI of the LEDs by controlling the output currents of the drivers of the power circuitry.

In one or more embodiments, the diffuser comprises a sheet of translucent material, with the light source placed along one or more of its edges. In another embodiment, the diffuser comprises a panel containing diffusion beads. In another embodiment, the diffuser may be an etched light guide plate, made of acrylic. In a further embodiment, the diffuser may be an LCD (Liquid Crystal Display) panel.

In one or more embodiments, the front panel may be glass or transparent plastic. The front panel may be offset (by a non-zero distance) forward from the diffuser, to provide a sense of depth to the light coming from the diffuser.

In one or more embodiments, the frame may be aluminum or wood.

In one or more embodiments, a system including such frames may be mounted together by an array of vertical or horizontal wall mount channels, with each individual frame having hardware to mount against the channels.

Such embodiments may be made to closely resemble windows, skylights or curtain walls, or panels thereof, and thus may be used for example, to resemble such systems even in the interior of buildings.

BRIEF DESCRIPTION OF THE DRAWINGS

The accompanying drawings are included to provide a further understanding of the disclosure, and are incorporated in and constitute a part of this specification.

DETAILED DESCRIPTION

Figure 1:
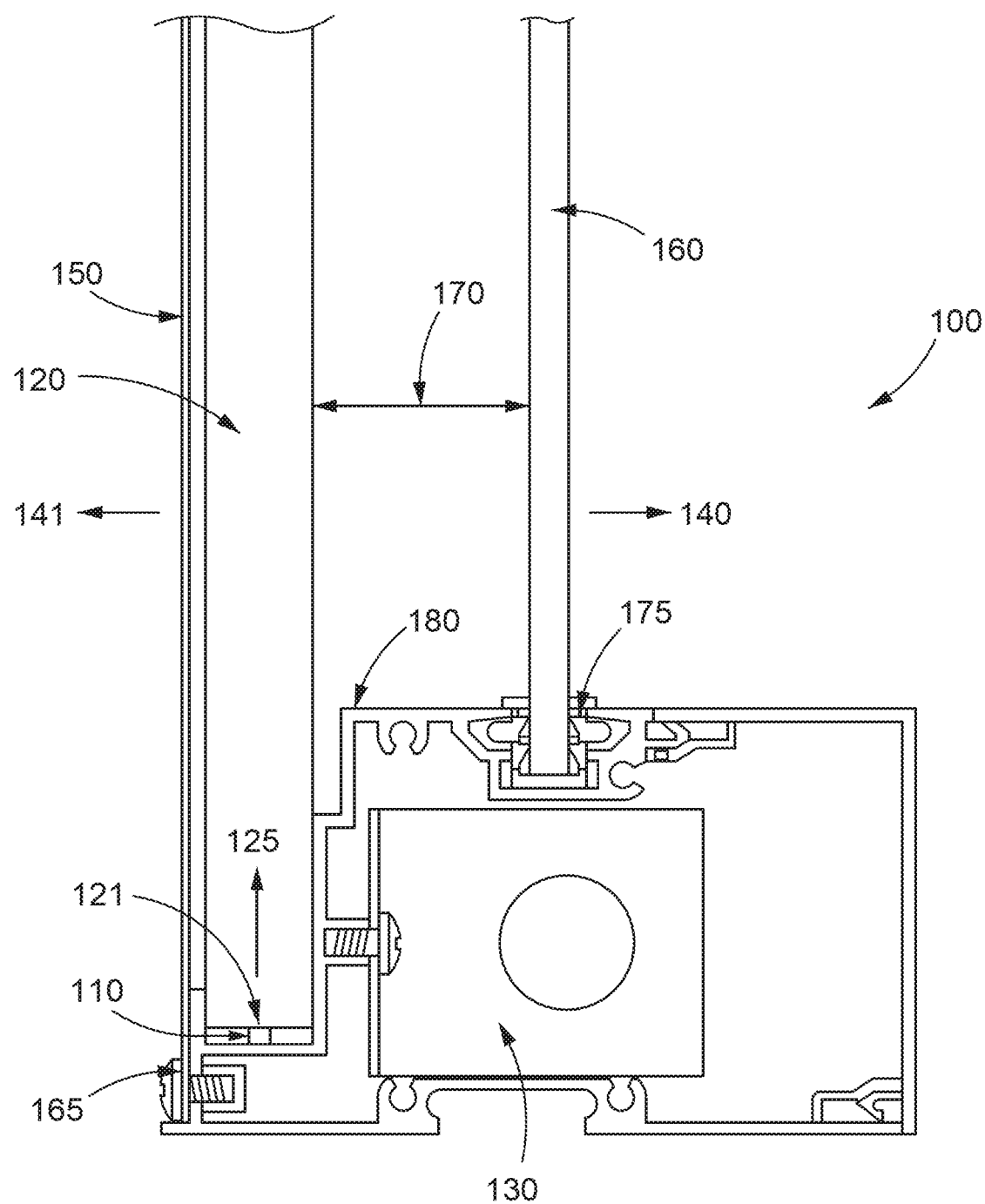
FIG. 1 is a diagram of an illuminated panel configured to emit light resembling that from a window or skylight, according to an embodiment.

Reference will now be made in detail to the various embodiments, examples of which are illustrated in the accompanying drawings. Wherever possible, the same reference numbers are used in the drawings and the description to refer to the same or like parts.

According to the design characteristics, a detailed description of the embodiments is given below.

FIG. 1 is a diagram of an illuminated panel 100 configured to emit light resembling that from a window or skylight, according to an embodiment. As shown in FIG. 1, light can be emitted from a light engine 110, which in an embodiment may be a linear row of LEDs, and which is placed along an edge 121 of a diffuser 120. In operation, the light engine 110 is driven by power circuitry 130, which may be for example an AC line-powered constant current driver. In another embodiment, multiple light engines 110 may emit light into multiple edges 121 of the diffuser 120.

The light emitted by the light engine 110 goes through an edge 121 of the diffuser 120 in a direction 125, and is then diffused by the diffuser 120. The resulting light is emitted by the diffuser 120 substantially perpendicular to the direction 125 of emission by the light engine 110, which may be both in a forward direction 140 and a backward direction 141, or primarily in the forward direction 140. A back panel 150 comprises, for example, a burnished metal layer and a reflector layer that collectively define a mirror. In this example, the reflector layer is disposed between the burnished metal layer and the diffuser 120. The back panel 150 can be attached to the frame behind the diffuser 120 to reflect light that is emitted from the diffuser 120 in the backward direction 141. The backward direction 141 and the forward direction 140 are substantially perpendicular to the direction 125 in that light from the diffuser 120 may vary from the backward direction 141 and the forward direction 140 due to the nature of the diffuser 120. Such light from diffuser 120 will then vary a corresponding amount from the direction 125.

The light emitted from the diffuser 120 in the forward direction 140 next passes through the front panel 160, which in an embodiment may be glass or plastic. For the embodiment shown in FIG. 1, the front panel 160 is separated by a certain non-zero distance 170 from the diffuser 120, which gives the illuminated panel 100 the appearance of depth. The non-zero distance 170 can be a function of the overall size of the illumination panel 100 and the brightness of the light emitted from the diffuser 120 in the forward direction 140 so that a desired appearance of depth can be obtained. The non-zero distance 170 can be, for example, one tenth of an inch, one half of an inch, one inch, two inches or three inches. In other embodiments, the distance between the diffuser and the front panel can be zero or substantially zero (allowing for manufacturing variations). The light passing through the front panel 160 is the light that is emitted from the illuminated panel 100. Note that the front panel 160 has a non-zero transmittance including, for example, 100% transparent or less than 100% transparent such as 99% transparent, 98% transparent, 95% transparent, 75% transparent, 50% transparent, 25% transparent, 10% transparent or 1% transparent.

As shown in FIG. 1, the light engine 110, diffuser 120 and back panel 150 may all be mounted together in a base extrusion 165, which is part of the illuminated panel 100. The front panel 160 may be separately mounted by a gasket 175 which is part of the illuminated panel 100. The illuminated panel 100 may include an infinity edge 180. Note that although a particular structure of the frame is shown in FIG. 1, other frame structures are possible. For example, the infinity edge is optional and not included in some other embodiments.

Figure 2:
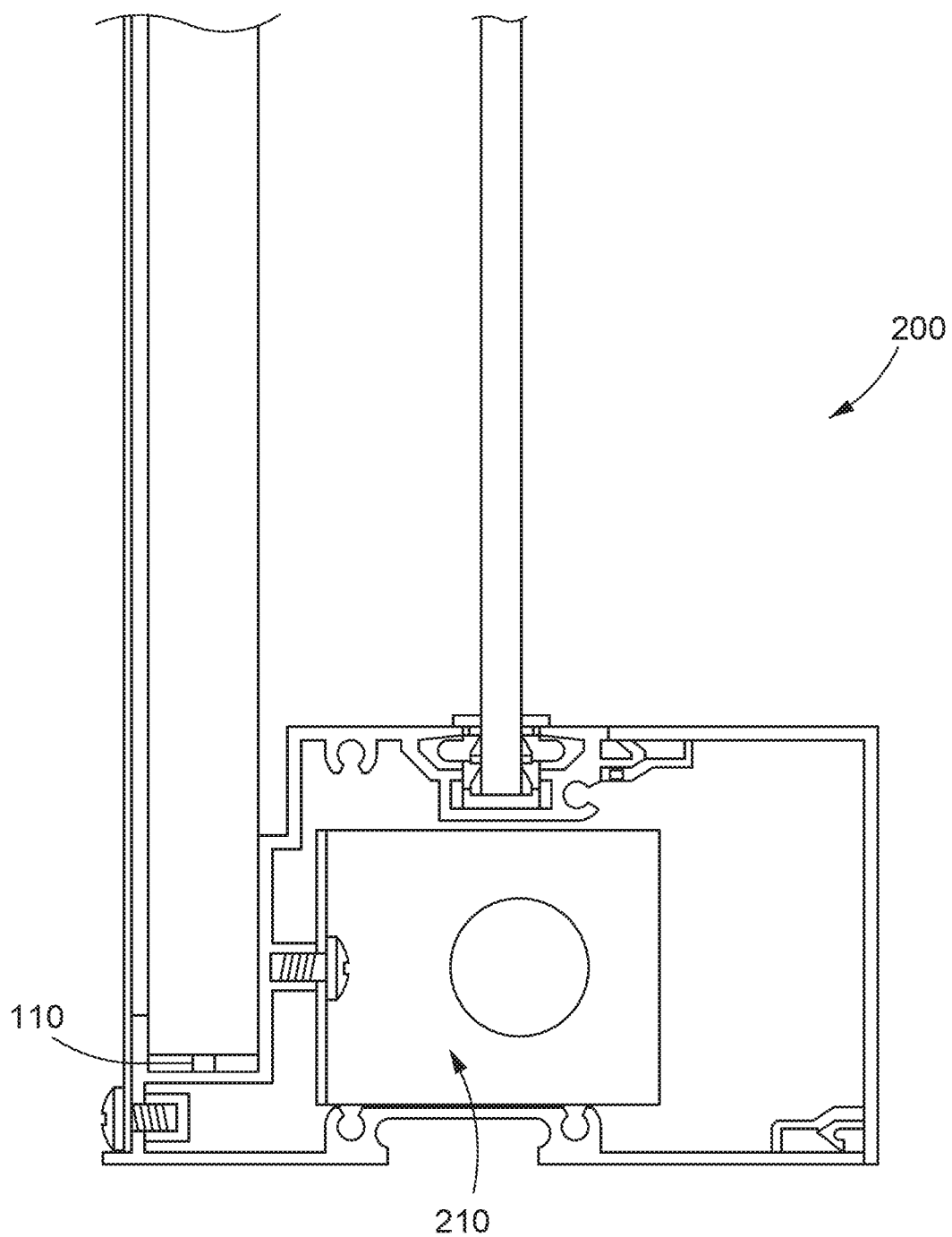
FIG. 2 is a diagram of an illuminated panel with controllable brightness, configured to emit light resembling that from a window or skylight, according to another embodiment.

FIG. 2 is a diagram of an illuminated panel 200 with controllable brightness, configured to emit light resembling that from a window or skylight, according to another embodiment. As shown in FIG. 2, the light engine 110 is driven by the power and control circuitry 210 (also referred to herein as "control circuitry," "power circuitry" or "LED driver"). The power circuitry of the power and control circuitry 210 may be for example an AC line-powered adjustable current driver. The control circuitry of the power and control circuitry 210 may respond to the external ambient or to control signals to adjust the current to the light engine 110, causing the light output from the light engine 110 to dim or brighten.

Figure 3:
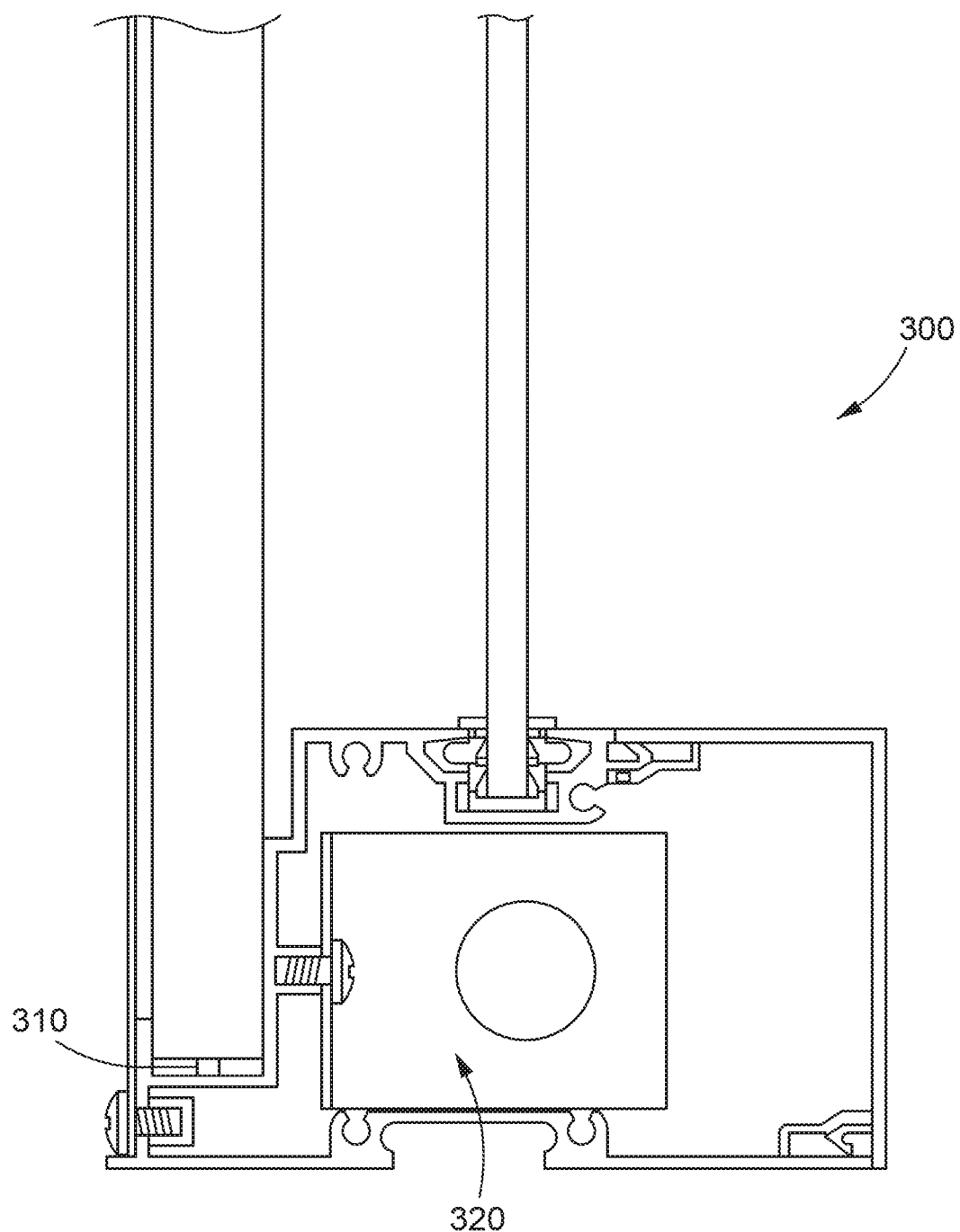
FIG. 3 is a diagram of an illuminated panel with controllable brightness and color, configured to emit light resembling that from a window or skylight, according to another embodiment.

FIG. 3 is a diagram of an illuminated panel 300 with controllable brightness and color, configured to emit light resembling that from a window or skylight, according to another embodiment. As shown in FIG. 3, the light engine 310 comprising multiple colors of LEDs, for example red, green and blue (not shown). The light engine 310 is driven by the power and control circuitry 320. The power circuitry of the power and control circuitry 320 may be for example multiple AC line-powered adjustable current drivers, one for each color of LEDs. The control circuitry of the power and control circuitry 320 may respond to the external ambient or to control signals to adjust the currents to the multiple colors of LEDs of the light engine 310, causing the light output from the light engine 310 to dim or brighten, assume different CCT or CRI or change color.

Figure 4:
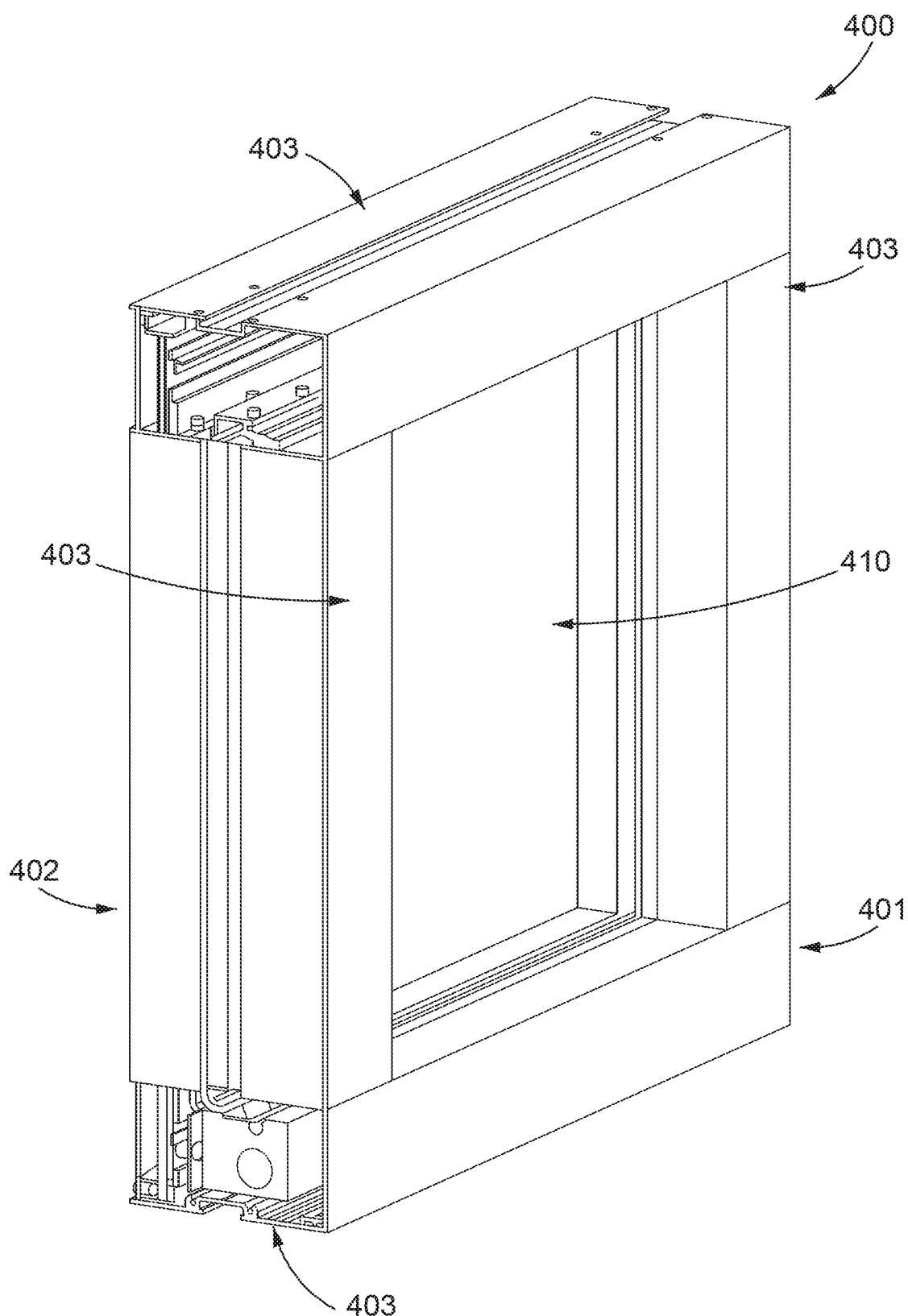
FIG. 4 is a diagram of a frame containing an illuminated panel, according to an embodiment.

FIG. 4 is a diagram of a frame 400 containing an illuminated panel 410, according to an embodiment. As shown in FIG. 4, the frame 400 comprises a front 401, a back 402 and four sides 403. The frame 400 may be designed in such a way that the elements of the illuminated panel 410 may be inserted into the frame 400 before the frame 400 is assembled. The illuminated panel 410 can be, for example, any of the illuminated panels 100, 200 or 300 of FIG. 1, 2 or 3, respectively, discussed above. The frame 400 further may be designed in such a way that the elements of the illuminated panel 410 are held rigidly in place by the frame 400.

Figure 5:
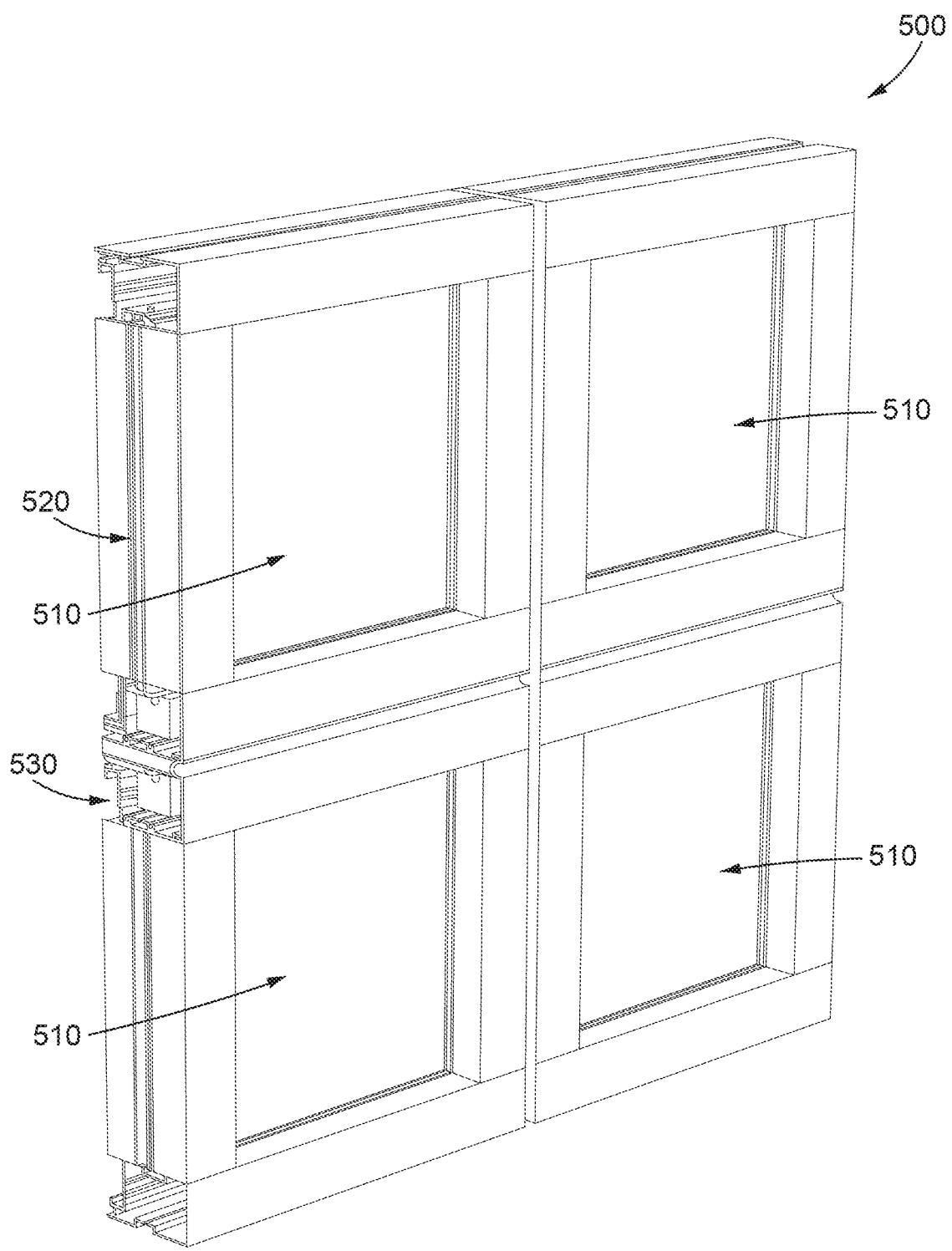
FIG. 5 is a diagram of a frame mounted into an array of such frames, according to an embodiment.

FIG. 5 is a diagram of an array 500 of such frames 510 mounted together, according to an embodiment. The frame 510 of FIG. 5 can be, for example, the frame 400 of FIG. 4. As shown in FIG. 5, vertical or horizontal wall mount channels 520 are used to position the array 500 of such frames 510, while hardware 530 on the rear of each frame 510 is used to mount the frames 510 against the channels 520. Although not shown in FIGS. 4 and 5, the frame 400 of FIG. 4 and the array 500 of frames 510 can each be attached to a shroud that surrounds and covers the perimeter of that frame 400 and array 500. Such a shroud can be, for example, a solid, non-transparent material that covers the outermost surfaces including the vertical and horizontal wall mount channels (such as wall mount channels 520 shown in FIG. 5).

An embodiment includes a method of operation. In this embodiment, a signal is received from a LED driver. Then, light is sent by at least one LED (such as light engine 110 in FIG. 1), based on the signal, into an edge of the diffuser at a first direction (e.g., edge 121 of diffuser 120 in a direction 125 of FIG. 1) such that light exits the diffuser at a second direction (e.g., direction 141 in FIG. 1) substantially perpendicular to the first direction. In another embodiment, the signal represents a brightness of output from a light engine coupled to the current driver.

It will be apparent to those skilled in the art that various modifications and variation can be made to the disclosed embodiments. In view of the foregoing, it is intended that the disclosure cover modifications and variations of the disclosed embodiments.

While various embodiments have been described and illustrated herein, a variety of other means and/or structures for performing the function and/or obtaining the results and/or one or more of the advantages described herein. More generally, all parameters, dimensions, materials, and configurations described herein are meant to be an example and that the actual parameters, dimensions, materials, and/or configurations will depend upon the specific application or applications. It is, therefore, to be understood that the foregoing embodiments are presented by way of example only and that embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Still further, some embodiments disclosed herein are distinguishable over prior art references by specifically lacking one or more features disclosed in the prior art; that is, claims to such embodiments may include negative limitations so as to be distinguished from the prior art.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. An apparatus, comprising:
a frame;
at least one LED disposed within the frame;
an LED driver coupled to the at least one LED;
a diffuser disposed within the frame, the at least one LED configured to light an edge of the diffuser at a first direction such that light exits the diffuser at a second direction substantially perpendicular to the first direction; and
a panel disposed within the frame and coupled to the diffuser such that the panel passes the light from the diffuser in the second direction,
the frame defining a recess and an infinity edge, an edge portion of the diffuser being disposed within the recess of the frame, the infinity edge of the frame being disposed a non-zero distance from a portion of the diffuser that is closest to the infinity edge of the frame without intervening structure and a non-zero distance from a portion of the panel that is closest to the infinity edge of the frame.

2. The apparatus of claim 1, wherein the panel is coupled to the diffuser at a non-zero distance from the diffuser.

3. The apparatus of claim 1, wherein the at least one LED is a white LED.

4. The apparatus of claim 1, wherein:
the at least one LED is a white LED, and
the LED driver is configured to control a brightness of the at least one white LED.

5. The apparatus of claim 1, wherein the at least one LED is three different colors of LEDs.

6. The apparatus of claim 1, wherein:
the at least one LED is three different colors of LEDs, and
the LED driver is configured to control a color and/or a brightness of the three different color of LEDs.

7. The apparatus of claim 1, wherein the diffuser is an etched light guide plate and made of acrylic.

8. The apparatus of claim 1, wherein the diffuser is a panel containing diffusion beads.

9. The apparatus of claim 1, wherein the diffuser is an LCD panel.

10. The apparatus of claim 1, wherein the panel is glass.

11. The apparatus of claim 1, wherein the panel is plastic.

12. The apparatus of claim 1, further comprising:
a shroud coupled to the frame and disposed a non-zero distance from the frame.

13. The apparatus of claim 1, wherein:
the frame is a first frame that is included within a plurality of frames, the diffuser is a first diffuser that is included within a plurality of diffusers, each diffuser from the plurality of diffusers being uniquely associated with a frame from the plurality of frames, each frame from the plurality of frames surrounds a perimeter of a diffuser that is from the plurality of the diffusers and that is associated with that frame, the plurality of frames having channels allowing each said frame from the plurality of frames to be mounted to at least one remaining frame from the plurality of frames, each frame from the plurality of frames having hardware to mount that frame at a channel of that frame to a channel of a remaining frame from the plurality of frames.

14. An apparatus, comprising:

a plurality of frames, each frame from the plurality of frames defining a recess and an infinity edge and including:

at least one LED disposed within that frame;

an LED driver coupled to the at least one LED;

a diffuser having an edge portion disposed within the recess of that frame, a perimeter of the diffuser being surrounded by that frame, the at least one LED configured to light an edge of the diffuser at a first direction such that light exits the diffuser at a second direction substantially perpendicular to the first direction; and a panel disposed within that frame and coupled to the diffuser such that the panel passes the light from the diffuser in the second direction, the infinity edge of the frame being disposed a non-zero distance from a portion of the diffuser that is closest to the infinity edge of the frame without intervening structure, each frame from the plurality of frames having at least one channel (1) along at least a portion of a perimeter of the frame and (2) configured to receive hardware to mount that frame to a channel of at least one remaining frame from the plurality of frames.

15. The apparatus of claim 14, wherein, for each frame from the plurality of frames:

the non-zero distance is a second non-zero distance, the panel for that frame is coupled to the diffuser for that frame at a first non-zero distance.

16. The apparatus of claim 14, wherein, for each frame from the plurality of frames:

the non-zero distance is a second non-zero distance, the infinity edge of that frame being disposed a first non-zero distance from a portion of the panel of that frame that is closest to the infinity edge of that frame.

17. The apparatus of claim 14, wherein, for each frame from the plurality of frames:

the non-zero distance is a second non-zero distance, the panel for that frame is coupled to the diffuser for that frame at a first non-zero distance, the infinity edge of that frame being disposed a third non-zero distance from a portion of the panel of that frame that is closest to the infinity edge of that frame.

18. The apparatus of claim 14, wherein, for each frame from the plurality of frames:

the non-zero distance is a second non-zero distance, the panel for that frame is coupled to the diffuser for that frame at a first non-zero distance, the infinity edge of that frame being disposed a third non-zero distance from a portion of the panel of that frame that is closest to the infinity edge of that frame, the first non-zero distance is greater than the third non-zero distance.

19. The apparatus of claim 14, wherein, for each frame from the plurality of frames:

the non-zero distance is a second non-zero distance, the panel for that frame is coupled to the diffuser for that frame at a first non-zero distance, the infinity edge of that frame being disposed a third non-zero distance from a portion of the panel of that frame that is closest to the infinity edge of that frame, the first non-zero distance is greater than the second non-zero distance and the third non-zero distance, the second non-zero distance is less than the third non-zero distance.

20. An apparatus, comprising:

a first frame;

at least one LED disposed within the first frame;

an LED driver coupled to the at least one LED;

a diffuser disposed within the first frame, a perimeter of the diffuser being surrounded by the first frame, the at least one LED configured to light an edge of the diffuser at a first direction such that light exits the diffuser at a second direction substantially perpendicular to the first direction; and a panel disposed within the first frame and coupled to the diffuser such that the panel passes the light from the diffuser in the second direction, the frame having at least one channel (1) along at least a portion of a perimeter of the frame and (2) configured to receive hardware to mount the first frame to a second frame, the first frame defining a recess and an infinity edge, an edge portion of the diffuser being disposed within the recess of the first frame, the infinity edge of the first frame being disposed a non-zero distance from a portion of the diffuser that is closest to the infinity edge of the first frame without intervening structure and a non-zero distance from a portion of the panel that is closest to the infinity edge of the first frame.

* * * * *